United States Patent Office 3,406,205
Patented Oct. 15, 1968

3,406,205
SUBSTITUTED DIPHENYLACETAMIDE
DERIVATIVES
Martin A. Davis, Montreal, Quebec, Canada, assignor to
American Home Products Corporation, New York,
N.Y., a corporation of Delaware
No Drawing. Filed Nov. 9, 1965, Ser. No. 507,068
13 Claims. (Cl. 260—558)

ABSTRACT OF THE DISCLOSURE

There are disclosed herein the compounds 2,2-diphenyl-2-methyl-, -2-ethyl-, -2-butyl-, and -2-benzylsulfonylacetamides; 2,2-diphenyl-2-ethylsulfinylacetamide; 2-phenyl-2-(o-, m-, and p-, fluorophenyl)-2-ethylsulfonylacetamides; 2,2-diphenyl-2-ethylsulfonyl-N-methyl-, -N,N-diethyl-, and N-benzylacetamides; and 2,2-diphenyl-2-ethylsulfonylacetanilide. A procedure for their preparation is also disclosed. The compounds show trichomonacidal activity and anti-inflammatory activity and formulations utilizing them as trichomonacidal agents and as anti-inflammatory agents are disclosed.

This invention relates to novel chemical compounds having useful biological activities. In particular, this invention relates to substituted diphenylacetamide derivatives of the following generic Formula I

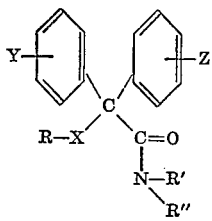

in which X represents the sulfone ($SO_2$) or sulfoxide (SO) groups, R represents a lower alkyl group of from 1 to 4 carbon atoms or R represents an aralkyl group, such as for example, the benzyl groups, R' and R" represent hydrogen, lower alkyl, aryl, or aralkyl, and Y and Z represent hydrogen, halogen, alkoxy, or lower alkyl.

The compounds of this invention of Formula I in which X represents SO or $SO_2$ show trichomonacidal activity and are useful as trichomonacidal agents especially against *T. vaginalis* and *T. foetus*. As trichomonacidal agents, the compounds of this invention may be formulated with suitable excipients in the form of vaginal suppositories or vaginal inserts containing from 10 mg. to 100 mg. of the active ingredients, and may be administered twice or thrice daily for periods of time of from two to several weeks.

Certain compounds of this invention have anti-inflammatory activity and are useful as anti-inflammatory agents in the treatment of rheumatic or related disorders caused by inflammatory processes. In particular, the compound 2,2-diphenyl-2-ethylsulfonylacetamide has marked anti-inflammatory activity in the paw-edema essay. It may be formulated as a suspension in an appropriate aqueous or oily vehicle for intramuscular injection; for oral application it may be formulated as dry-powder capsules or compressed tablets containing the necessary excipients, lubricants and binders. The formulations are compounded in such a manner so as to contain from 10 to 200 mg. of the active ingredients per unit dosage form, said dosage forms to be given once to three times daily.

The compounds of this invention may be prepared by the following general route:

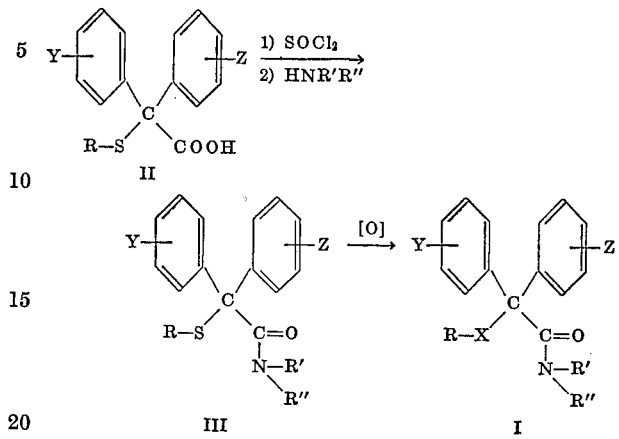

where R, R', R", X, Y and Z are as defined above. Thus, a 2,2-diphenyl-2-alkylthio (or aralkylthio) acetic acid is treated with thionyl chloride and the resulting carboxylic acid chloride is allowed to react with ammonia or a suitably-substituted primary or secondary amine to form the corresponding carboxamide derivative (III). This in turn is treated with an appropriate oxidising agent to form the corresponding sulfoxide (X=SO) or sulfone (X=$SO_2$) analogues. As an oxidising agent to form the sulfoxide one may conveniently use a peracid such as, for example, m-chloroperbenzoic acid dissolved in an inert solvent such as, for example dichloromethane, in an amount just sufficient to furnish one oxygen atom per molecule of the carboxamide. In order to form the related sulfone one may use the same oxidising agent in an amount sufficient to furnish two oxygen atoms; in practice it is desirable to use a slight excess of the oxidant.

The starting materials for the compounds of this invention, that is the carboxylic acids of Formula II, may be prepared by known methods as described, for example, in Helv. Chim. Acta, 8, 582 (1925). A benzilic acid, optionally containing nuclear substituents, for example, halogen, is dissolved in acetic acid containing an alkyl- or aralkylmercaptan. The mixture is then treated with concentrated sulfuric acid to give the desired 2-alkylthio or 2-aralkylthioacetic acid which is isolated and purified in the conventional manner. Certain of the carboxylic acids of Formula II may be prepared by a process described in J. Org. Chem., 26 1573 (1961). A 2-chloro-2,2-diphenylacetic acid and a mercaptan are heated together in an inert solvent, for example, benzene, in the presence of an alkaline agent, for example, calcium carbonate, and the reaction mixture is processed in a conventional manner to give the desired carboxylic acid.

The following descriptive examples will illustrate this invention.

Example 1

To a mixture of 100 g. (0.44 mole) of benzilic acid 33 g. (0.53 mole) of ethyl mercaptan in 500 cc. of acetic acid is added dropwise over 1.5 hours with stirring, 135 cc. of conc. sulfuric acid. After half of the acid has been added, the mixture becomes homogenous and a red color develops; a precipitate then separates. The mixture is stirred at room temperature for 1.5 hours and poured into ice-water. The residue is dissolved in chloroform, the solution thoroughly extracted with water until the sulfuric acid has been removed, and then dried and concentrated to give a residue, M.P. 128–132° C. Recrystallization from carbon tetrachloride yields 2,2 - diphenyl-2 - ethylthioacetic acid, M.P. 130.5–131.5° C., identical with the compound reported by E. G. Brain et al., in J. Chem. Soc. 1962, p. 1445.

In the same manner, but using the appropriate mercaptans and benzilic acids as starting materials, there are also obtained 2 - butylthio - 2,2 - diphenylacetic acid, M.P. 107–108.5° C., identical with the compound reported by C. Barkenbus and F. Brower, J. Am. Chem. Soc., 77, 579 (1955); 2 - benzylthio - 2,2 - diphenylacetic acid, M.P. 181–182°, also identical with the product reported by Barkenbus and Brower cited above; 2,2 - diphenyl - 2 - methylthioacetic acid, M.P. 179–180°; 2-ethylthio - 2 - (o-fluorophenyl) - 2 - phenylacetic acid M.P. 153–154° C.; 2 - ethylthio - 2 - (m-fluorophenyl)-2 - phenylacetic acid (oil); and 2 - ethylthio-2-(p-fluorophenyl)-2-phenylacetic acid; M.P. 121–122°.

The composition of the above compounds is confirmed by elemental analysis.

Example 2

45 g. (0.17 mole) of 2 - ethylthio - 2,2 - diphenylacetic acid prepared as described in Example 1, are added in portions to a well-stirred solution of 31.3 g. of (0.26 mole) of thionyl chloride in 460 ml. of dry benzene and 0.5 ml. of dimethylformamide. The solution is refluxed for 1.5 hours and concentrated to yield 2,2 - diphenyl-2-ethylthio-acetyl chloride as an oil.

In the same manner, by using as starting materials the appropriate acids described in Example 1, the following acid chlorides are also obtained:

2,2-diphenyl-2-butylthio-acetyl chloride;
2,2-diphenyl-2-benzylthio-acetyl chloride;
2,2-diphenyl-2-methylthio-acetyl chloride;
2-(o-fluorophenyl)-2-phenyl-2-ethylthio-acetyl chloride;
2-(m-fluorophenyl)-2-phenyl-2-ethylthio-acetyl chloride; and
2-(p-fluorophenyl)-2-phenyl-2-ethylthio-acetyl chloride.

The above acid chlorides are obtained as oils and are converted without purification to the corresponding amides or substituted amides described in Example 3.

Example 3

2,2 - diphenyl-2-ethylthioacetyl chloride (48.0 g., 0.17 mole) obtained as described in Example 2, in 60 ml. of dry dioxane is added dropwise with stirring to 225 ml. of concentrated ammonium hydroxide, water is added, and the resulting precipitate is taken up in dichloromethane. The solution is washed with water, then sodium bicarbonate solution, and evaporated to yield a solid, M.P. 130.5–131.5° C. Recrystallization from 2 - propanol gives 2,2-diphenyl-2-ethylthioacetamide, M.P. 131.5–132.5° C.

In the same manner, but using the appropriate acid chlorides obtained as described in Example 2, and the appropriate amines as starting materials, there are also obtained:

2,2-diphenyl-2-methylthioacetamide, M.P. 154–155° C.;
2-butylthio-2,2-diphenylacetamide, M.P. 88.5–90° C.;
2-ethylthio-2-(o-fluorophenyl)-2-phenylacetamide, M.P. 104–105° C.;
2-ethylthio-2-(m-fluorophenyl)-2-phenylacetamide, M.P. 105–106° C.;
2-ethylthio-2-(p-fluorophenyl)-2-phenylacetamide, M.P. 147.5–148.5° C.;
2-benzylthio-2,2-diphenylacetamide, M.P. 190–191° C.;
2,2-diphenyl-2-ethylthio-N-methylacetamide, M.P. 85–86° C.;
2,2-diphenyl-2-ethylthio-N,N-diethylacetamide (oil);
2,2-diphenyl-2-ethylthioactanilide, M.P. 120–121° C; and
2,2-diphenyl-2-ethylthio-N-benzylacetamide, M.P. 92–93° C.

The composition of the above compounds, except for 2,2 - diphenyl - 2 - ethylthio-N,N-diethylacetamide, is confirmed by elemental analysis. The latter compound is converted to the corresponding sulfone and analyzed as such (see Example 5).

Example 4 m-Chloro-perbenzoic acid (5.56 g. of 81.7% concentration, 0.03 mole) in 100 ml. of dichloromethane, is added slowly to a stirred solution of 2,2 - diphenyl-2-ethylthioacetamide obtained as described in Example 3 (0.03 mole) in 75 ml. of dichloromethane. The solution is stirred at room temperature for an additional 2 hours, washed with sodium bicarbonate solution and water, dried and concentrated to give an oil. Two recrystallizations from chloroform-hexane yields the corresponding sulfoxide 2,2 - diphenyl - 2 - ethylsulfinylacetamide, M.P. 118–122° C.

In the same manner, but using the appropriate amides described in Example 3 as the starting materials, the following sulfoxides are also obtained:

2,2-diphenyl-2-methylsulfinylacetamide;
2,2-diphenyl-2-butylsulfinylacetamide;
2-phenyl-2-(o-fluorophenyl)-2-ethylsulfinylacetamide;
2-phenyl-2-(m-fluorophenyl)-2-ethylsulfinylacetamide;
2-phenyl-2-(p-fluorophenyl)-2-ethylsulfinylacetamide;
2,2-diphenyl-2-benzylsulfinylacetamide;
2,2-diphenyl-2-ethylsulfinyl-N-methylacetamide;
2,2-diphenyl-2-ethylsulfinyl-N,N-diethylacetamide;
2,2-diphenyl-2-ethylsulfinylacetanilide; and
2,2-diphenyl-2-ethylsulfinyl-N-benzylacetamide.

Example 5

To a well stirred solution of 2,2 - diphenyl - 2 - ethylthioacetamide, obtained as described in Example 3 (30.0 g., 0.12 mole) in 300 ml. of methylene chloride is added slowly 81.7% m-chloroperbenzoic acid (51.9 g., 0.25 mole) in 650 ml. of methylene chloride. The reaction mixture is stirred at room temperature for 1.5 hours, cooled, and filtered. The filtrate is washed with sodium hydrogen sulfite, then sodium bicarbonate solution, and water. It is dried and concentrated to give a solid which on recrystallization from 2 - propanol yields the sulfone, 2,2-diphenyl-2-ethylsulfonylacetamide, M.P. 159–160° C.

In the same manner, but using the appropriate amides obtained as described in Example 3 as starting materials, the following sulfones are also obtained:

2,2-diphenyl-2-methylsulfonylacetamide, M.P. 213–214 C.;
2,2-diphenyl-2-butylsulfonylacetamide, M.P. 162–163° C.;
2-phenyl-2-(o-fluorophenyl)-2-ethylsulfonylacetamide, M.P. 137–138° C.;
2-phenyl-2-(m-fluorophenyl)-2-ethylsulfonylacetamide, M.P. 187–188° C.;
2-phenyl-2-(p-fluorophenyl)-2-ethylsulfonylacetamide, M.P. 162.5–163.5° C.;
2,2-diphenyl-2-benzylsulfonylacetamide, M.P. 174–175° C.;
2,2-diphenyl-2-ethylsulfonyl-N-methylacetamide, M.P. 184–185° C.;
2,2-diphenyl-2-ethylsulfonyl-N,N-diethylacetamide, M.P. 157–158° C.;
2,2-diphenyl-2-ethylsulfonylacetanilide, M.P. 168–169° C.; and
2,2-diphenyl-2-ethylsulfonyl-N-benzylacetamide, M.P. 125–126° C.

The composition of the above compounds is confirmed by elemental analysis.

I claim:
1. A compound of the formula

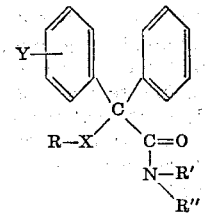

wherein X is selected from sulfone and sulfoxide; R is selected from methyl, ethyl, butyl and benzyl; R' is selected from hydrogen, methyl, ethyl, phenyl and benzyl; R'' is selected from hydrogen and ethyl; and Y is selected from hydrogen and fluorine.

2. 2,2-diphenyl-2-ethylsulfinylacetamide as claimed in claim 1.

3. 2,2-diphenyl-2-ethylsulfonylacetamide as claimed in claim 1.

4. 2,2-diphenyl-2-methylsulfonylacetamide as claimed in claim 1.

5. 2,2-diphenyl-2-butylsulfonylacetamide as claimed in claim 1.

6. 2 - phenyl - 2 - (o-fluorophenyl)-2-ethylsulfonylacetamide as claimed in claim 1.

7. 2 - phenyl-2-(m-fluorophenyl)-2-ethylsulfonyl-acetamide as claimed in claim 1.

8. 2 - phenyl-2-(p-fluorophenyl)-2-ethylsulfonylacetamide as claimed in claim 1.

9. 2,2-diphenyl-2-benzylsulfonylacetamide as claimed in claim 1.

10. 2,2-diphenyl-2-ethylsulfonyl-N-methylacetamide as claimed in claim 1.

11. 2,2-diphenyl-2-ethylsulfonyl-N,N-diethylacetamide as claimed in claim 1.

12. 2,2-diphenyl-2-ethylsulfonylacetanilide as claimed in claim 1.

13. 2,2-diphenyl-2-ethylsulfonyl-N-benzylacetamide as claimed in claim 1.

References Cited

UNITED STATES PATENTS 2,759,927   8/1956   Suter _____ 260—562

OTHER REFERENCES

Houben-Weyl, Methoden der Organischen Chemie, vol. 9, pp. 211–13, 227–29 (1955), QD258 H7.

HENRY R. JILES, *Primary Examiner.*

H. I. MOATZ, *Assistant Examiner.*